United States Patent [19]

Brown

[11] Patent Number: 5,071,664
[45] Date of Patent: Dec. 10, 1991

[54] METHOD OF REMOVING SULFITES FROM STANDARD WINE

[76] Inventor: Sand T. Brown, 1664 Grist Mill, Marietta, Ga. 30062

[21] Appl. No.: 638,826

[22] Filed: Jan. 8, 1991

Related U.S. Application Data

[63] Continuation of Ser. No. 424,619, Oct. 20, 1989, abandoned.

[51] Int. Cl.$^5$ .............................................. C12G 1/04
[52] U.S. Cl. .................................... 426/271; 426/592
[58] Field of Search ............................... 426/271, 592

[56] References Cited

U.S. PATENT DOCUMENTS

| | | | |
|---|---|---|---|
| 2,494,257 | 1/1950 | Nickol | 426/271 |
| 2,500,171 | 3/1950 | Gause | 426/271 |
| 2,667,417 | 1/1954 | Delmousee | 426/271 |
| 2,682,468 | 6/1954 | Frampton | 426/271 |
| 3,437,491 | 4/1969 | Peterson | 426/271 |
| 4,156,025 | 5/1979 | Dalglash | 426/271 |
| 4,156,026 | 5/1979 | Gogel | 426/271 |
| 4,205,092 | 5/1980 | Mattick | 426/271 |
| 4,775,541 | 10/1988 | Brown | 426/271 |

FOREIGN PATENT DOCUMENTS 2213343  1/1973  France ............................... 426/592

OTHER PUBLICATIONS

Article from Chemical & Engineering News, pp. 19–28, by Cornelius S. Ough, "Chemicals Used in Making Wine", Jan. 5, 1987.

*Primary Examiner*—Carolyn Paden
*Attorney, Agent, or Firm*—Jones, Askew & Lunsford

[57] ABSTRACT

A method of removing sulfites from standard wine comprising the steps of passing a standard wine through a base anion exchange resin, then passing the wine through an acid cation exchange resin, and then treating the wine with carbon, whereby a standard wine having less than 10 ppm of sulfites is obtained. The invention further includes a method of producing a grape standard wine having less than 10 ppm of sulfites.

11 Claims, No Drawings

METHOD OF REMOVING SULFITES FROM STANDARD WINE

This is a continuation of application Ser. No. 07/424,619, filed Oct. 20, 1989 which is now abandoned.

FIELD OF INVENTION

This invention relates to a method for the removal of sulfites from standard wine. More specifically, this invention relates to a method for producing a grape standard wine having less than 10 ppm of sulfites.

BACKGROUND OF THE INVENTION

The wine-making industry is closely regulated, an example of which is shown by the classification of wines in 26 U.S.C. 5381-5392. Standard wine is known as an extremely desirable wine of high quality. The term "standard wine" refers to a wine which has not been ameliorated (that is, diluted with water) and which has a light transmission value significantly unaltered by the manufacturing process, although high acid wines may be ameliorated in accordance with 26 U.S.C. 5383 (b)(1). Any unauthorized amelioration or significant alteration of the light transmissibility of the wine will require the reclassification of the wine as a "substandard wine."

All grape wines (that is, wines made solely from grapes) contain sulfites which are derived from the soil and/or added during picking to prevent spoilage. In the wine-making industry, grapes are generally treated with sulfites prior to and after crushing to control undesirable micro-organisms, inhibit browning and serve as an antioxidant. After the fermentation process, sulfites may be added to prevent secondary fermentation. While supplying these benefits during the wine-making process, sulfites offer little, if any, benefit after the wine-making process is completed and may impart undesirable taste qualities to the wine and prevent those who are allergic to sulfites from enjoying the wine.

It is known in the art to employ ion exchange techniques in the decolorization of wines. U.S. Pat. No. 4,775,541 ('541 patent) discloses the steps of passing a wine through a basic anion exchange resin and then through an acidic cation exchange resin to decolorize a generally acidic wine. The '541 patent discloses a preliminary optional step of passing the wine through a carbon filter, for the purpose of removing suspended solids to enhance the longevity of the anion and cation exchange resins. The main objective of the '541 invention is the decolorization of citrus wine. Obviously, decolorization of a standard wine would significantly alter the light transmissibility of the wine, such that the decolorized wine may no longer be classified as a standard wine.

Therefore, a need exists for a method to remove sulfites to enhance the commercial value of standard wine, especially high quality grape standard wines.

SUMMARY OF THE INVENTION

The present invention solves the above-described need by providing a method of producing a standard wine which has little or no sulfites and which, therefore, can be categorized as sulfite-free. (For purposes of this invention, a sulfite-free wine is a wine having less than 10 ppm sulfites.)

Generally described, the method of this invention comprises the steps of first passing a standard wine through a strong base anion exchange resin, then passing the wine through a strong acid cation exchange resin, and then treating the wine with carbon, whereby a standard wine having less than 10 ppm of sulfites is produced.

The preferred method of this invention comprises the steps of first passing a grape standard wine through a strong base anion exchange resin chamber whose resins have been regenerated utilizing sodium hydroxide. In this step, the pH of the wine increases to the range of 11-11.5, and organics in the wine (such as flavonides, odors and sulfites) are bound to the surface of the resins.

The wine is then passed through a strong acid cation exchange resin chamber whose resins have been regenerated utilizing hydrochloric acid. In this step, the wine achieves a pH value of between 3.8-4.1, and any additional organics are adsorbed onto the surface of the cation resins, thus removing remaining odors and metals and stabilizing the wine to enhance shelf life.

Finally, the wine is treated with carbon to remove any residual amine odors which may have been imparted by the anion exchange resin and for additional removal of sulfites. Carbon treatment may be accomplished either by the use of granular activated carbon which is placed in a fixed bed chamber or by the addition of powdered carbon directly to the wine in a processing tank where the wine remains for 24 hours before being filtered, such as by means of a plate and frame filter.

Thus, a principal object of this invention is to provide a method of removing sulfites from wine.

A further object of this invention is to remove sulfites from wine without amelioration of the wine or significantly altering the light transmissibility of the wine.

A further object of this invention is to remove sulfites from a standard wine without significantly altering the color or vinosity of the wine.

A further object of this invention is to provide a grape standard wine having less than 10 ppm of sulfites.

Other objects, features and advantages of the present invention will become apparent from reading the following specification when taken in conjunction with the accompanying claims.

DETAILED DESCRIPTION OF THE PREFERRED EMBODIMENT

The present process was developed primarily for the removal of sulfites from grape standard wine. As already mentioned, strict standards are involved in the labelling of a wine as a standard wine. To be classified as sulfite-free, a wine must contain less than 10 ppm of sulfites.

The process by which a grape standard wine is produced is well known in the art and need not be detailed here. Also, the fortification of a grape standard wine using grape neutral spirits to the extent necessary to raise the alcohol content to the desired levels of 14, 20 or 24 percent alcohol is well known in the art and need not be detailed here.

In general, to make a sulfite-free grape standard wine, careful attention must be given to the selection of the wine, the grape, and any neutral spirits that may be used for fortification. The wine selected preferably has little or no color or character, but is high in sugars which ferment readily into alcohol, such wine preferably being made from Thompson seedless grapes. After picking, the grapes are crushed and fermented to 10½ percent to 11 percent alcohol by volume. The resultant wine has little character and no obvious color. The wine has little nose, the only pronounced odor attributable to the presence of various sulfites which have been added to control undesirable micro-organisms, inhibit browning and serve as an anti-oxidant.

After the grapes are crushed, the juices are removed and cold fermented at 55° F. The wine is then treated with bentonite for heat stability and centrifuged. Next, the wine is chilled to a temperature of between 53°-58° F. to cold stabilize the wine. Carbon treatment of 0.73 pounds per 1000 gallons of wine is then used for color adjustment and filtration of the wine. Present governmental standards impose a maximum of nine pounds on the total amount of carbon that can be employed per 1000 gallons of liquid product to be treated. No other procedures are performed to the wine at this point except for chilling during storage.

The sulfite removal process of this invention incorporates the use of anion and cation exchange resins and activated carbons in a process known as chemisorption (the adsorption of organic molecules by means of Vanderwaals forces). Vanderwaals forces permit the adsorption of organics (such as flavonides, odors and sulfites) onto the surfaces of the anion and cation exchange resins.

When the winery treatment is completed, the wine preferably meets the following specifications:
Alcohol content: 10.5 to 11.5 percent by volume
Color: clear
Clarity: 95 percent light transmission as measured at 420 nanometers using the American Organization of Organic Chemists (AOAC) standard test to determine light transmission
pH: 3.5 to 3.8
Total acidity: less than or equal to 0.6 grams/liter.
Volatile acidity: less than or equal to 0.1 grams/liter
Identity: grape standard wine
Sulfite concentration: 40-150 ppm (as measured using the AOAC standard test to determine sulfite concentration)

The wine should possess a minimum character with no color and minimal taste or aroma.

The anion exchange resins useful in this invention are those resins which are strongly basic in character. Specific examples include those resins commercially available from Rohm & Haas Co. under the trademark IRA, such as IRA-900 and IRA-958, and from Purolite Company under the trademark Purolite, such as Purolite A-500 and Purolite A-300. A mixture of anion exchange resins may be used.

The cation exchange resins useful in this invention are those resins which are strongly acidic in character. Specific examples include those resins commercially available from Rohm & Haas Co. under the trademark IR, such as IR-120, and from Purolite Company under the trademark Purolite, such as Purolite C-100. A mixture of cation exchange resins may be used.

The carbon treatment of this invention is accomplished by using a source of activated carbon, such as granular activated carbon. A specific example is a granular activated carbon sold under the trademark Cecarbon GAC 1240 available from Atochem, Inc. A mixture of activated carbons may be used.

The standard wine produced by this invention may be further treated by the addition of neutral spirits, colorants, etc., in order to achieve specific objectives.

This invention is further illustrated by the following examples which are illustrative of certain embodiments designed to teach those of ordinary skill in the art how to practice this invention and to represent the best mode contemplated for carrying out this invention.

EXAMPLES 1-5

The wine is taken from an insulated tank and circulated through a chiller to maintain the temperature in a range of 50°-55° F. This temperature range is necessary to prevent secondary fermentation.

The wine is pumped at a flow rate of between 10 and 15 gallons per minute into a strong base anion exchange resin chamber containing between 38-50 cubic feet of Purolite A-500 resin which has been regenerated utilizing 4% food grade sodium hydroxide. During passage through the anion exchange chamber, the temperature of the wine rises to between 53°-58° F., the pH of the wine increases to a range of 11-11.5, and organics (such as flavonides, odors and sulfites) in the wine are bound to the surface of the anion exchange resin. It is important at this stage to maintain wine temperature below 60° F. to prevent spoilage.

The wine exits the strong base anion chamber and enters at the same flow rate into a strong acid cation resin chamber containing between 10-15 cubic feet of Purolite C-100 resin which has been regenerated utilizing 10% food grade hydrochloric acid. During passage through the cation exchange resin, the pH of the wine drops to between 3.0-4.1, and anion-based organics are adsorbed onto the surface of the cation resins, thereby removing odors and metals. This step also stabilizes the wine to enhance shelf life.

At this point, the wine is stable and an increase in temperature will not adversely affect the wine. Following this step, the wine may be analyzed to determine the success of the sulfite removal and quality of the wine.

The wine is then carbon-treated to remove any residual sulfites and any amine odors which may be imparted by the anion exchange resin. This is accomplished by the use of a granular activated carbon which is placed in a fixed bed chamber. The amount of carbon used is such that the volume of carbon, as previously mentioned, does not exceed 9 pounds per 1000 gallons of wine.

The wine is then analyzed utilizing gas chromatography and proofed to assure compliance with product requirements. The wine may be fortified using grape neutral spirits to the extent necessary to raise the alcohol content to the desired levels of 14, 20 or 24 percent. The resultant wine is examined to determine that there has been no significant alteration of the light transmissibility when compared to the beginning wine.

Using this procedure, the following wine batches show these results:

| Example | Sulfite Content Prior to Treatment (ppm) | Sulfite Content After Treatment (ppm)* |
| --- | --- | --- |
| 1 | 114 | None |
| 2 | 47 | None |
| 3 | 68 | None |
| 4 | 136 | None |
| 5 | 144 | None |

*Determined by the AOAC test in which the minimum detection level is 10 ppm.

As can be seen from the above examples, this invention provides a useful and effective method for removing sulfites from standard wines.

The foregoing description relates to certain embodiments of the present invention, and modifications or alterations may be made without departing from the spirit and scope of the invention as defined in the following claims.

I claim:

1. A method of removing sulfites from a standard wine without significantly altering the color or vinosity of the wine, comprising the sequential steps of:
    passing a standard wine through a strong base anion exchange resin;
    passing the wine through a strong acid cation exchange resin; and
    treating the wine with carbon;
    whereby a standard wine having less than 10 ppm of sulfites is obtained.

2. The method of claim 1, wherein the standard wine comprises grape standard wine.

3. The method of claim 1, wherein the anion exchange resin comprises resins which have been regenerated utilizing sodium hydroxide.

4. The method of claim 1, wherein the wine after treatment with the anion exchange resin has a pH of approximately 11-11.5.

5. The method of claim 1, wherein the cation exchange resin comprises resins which have been generated utilizing hydrochloric acid.

6. The method of claim 1, wherein the wine after treatment with the cation exchange resin has a pH of approximately 3.8-4.1.

7. The method of claim 1, wherein the amount of carbon does not exceed 9 pounds per 1000 gallons of wine.

8. The method of claim 1, wherein the wine has at least 95% light transmissibility.

9. The method of claim 1, wherein the wine having less than 10 ppm of sulfites comprises a standard wine having at least 95% light transmissibility.

10. A method of removing sulfites from a standard wine without significantly altering the color or vinosity of the wine, comprising the sequential steps of:
    passing a standard wine having at least 95% light transmissibility through a strong base anion exchange resin;
    passing the wine through a strong acid cation exchange resin; and
    treating the wine with carbon;
    whereby a standard wine having at least 95% light transmissibility and having less than 10 ppm of sulfites is obtained.

11. The method of claim 10, wherein said standard wine comprises grape standard wine.

* * * * *